US008145654B2

(12) United States Patent
Miller (10) Patent No.: US 8,145,654 B2
(45) Date of Patent: Mar. 27, 2012

(54) SYSTEMS AND METHODS FOR DOCUMENT SEARCHING

(75) Inventor: David James Miller, Dayton, OH (US)

(73) Assignee: LexisNexis Group, Miamisburg, OH (US)

( * ) Notice: Subject to any disclaimer, the term of this patent is extended or adjusted under 35 U.S.C. 154(b) by 607 days.

(21) Appl. No.: 12/213,538

(22) Filed: Jun. 20, 2008

(65) Prior Publication Data

US 2009/0319510 A1 Dec. 24, 2009

(51) Int. Cl.
*G06F 17/30* (2006.01)

(52) U.S. Cl. ........................................................ 707/757

(58) Field of Classification Search .................. 707/757
See application file for complete search history.

(56) References Cited

U.S. PATENT DOCUMENTS

| | | | |
|---|---|---|---|
| 5,175,814 A * | 12/1992 | Anick et al. .................. 715/835 |
| 5,278,980 A * | 1/1994 | Pedersen et al. ...................... 1/1 |
| 5,375,235 A * | 12/1994 | Berry et al. ............................. 1/1 |
| 5,638,543 A * | 6/1997 | Pedersen et al. .................. 704/1 |
| 5,758,148 A * | 5/1998 | Lipovski .............................. 1/1 |
| 5,777,608 A * | 7/1998 | Lipovski et al. .............. 345/519 |
| 5,890,103 A | 3/1999 | Carus |
| 6,233,575 B1 | 5/2001 | Agrawal et al. |
| 6,484,168 B1 * | 11/2002 | Pennock et al. ...................... 1/1 |
| 6,772,170 B2 * | 8/2004 | Pennock et al. ...................... 1/1 |
| 6,834,276 B1 * | 12/2004 | Jensen et al. ............................. 1/1 |
| 6,856,988 B1 * | 2/2005 | Humphrey et al. ........... 707/749 |
| 7,027,987 B1 * | 4/2006 | Franz et al. .................. 704/236 |
| 7,155,427 B1 * | 12/2006 | Prothia et al. ................. 707/694 |
| 7,519,589 B2 * | 4/2009 | Charnock et al. ...................... 1/1 |
| 7,574,449 B2 * | 8/2009 | Majumder ........................... 1/1 |
| 7,636,732 B1 * | 12/2009 | Nielsen ................................ 1/1 |
| 7,752,200 B2 * | 7/2010 | Scholl et al. .................... 707/730 |
| 7,836,043 B2 * | 11/2010 | Jensen et al. ................... 707/709 |
| 7,836,061 B1 * | 11/2010 | Zorky ............................ 707/749 |
| 7,930,306 B2 * | 4/2011 | Scholtes et al. ............... 707/750 |
| 2003/0041072 A1 * | 2/2003 | Segal et al. ................ 707/104.1 |
| 2003/0097375 A1 * | 5/2003 | Pennock et al. ............ 707/104.1 |
| 2003/0227487 A1 * | 12/2003 | Hugh ............................ 345/777 |
| 2004/0006742 A1 * | 1/2004 | Slocombe ..................... 715/513 |
| 2005/0027702 A1 * | 2/2005 | Jensen et al. ...................... 707/3 |
| 2006/0041536 A1 * | 2/2006 | Scholl et al. ...................... 707/3 |
| 2006/0064427 A1 * | 3/2006 | Segal et al. .................... 707/100 |

(Continued)

OTHER PUBLICATIONS

A. Jennings et al., "A Personal News Service Based on a User Model Neural Network", IEICE Transactions On Information and Systems, Information & Systems Society, Tokyo, JP, vol. E75-D, No. 2, Mar. 1, 1992, pp. 198-209.

(Continued)

*Primary Examiner* — Mark Andrew X Radtke (74) *Attorney, Agent, or Firm* — Finnegan, Henderson, Farabow, Garrett & Dunner, LLP.

(57) ABSTRACT

Systems and methods are provided for document searching. In one implementation, a computer-implemented method provides keyword searching. The method may receive a plurality of noisy keywords for a document collection. A server may generate tokens for a plurality of keywords in the document collection and merge the tokens to create an index. A search query may be received. The search query may include at least one search phrase. For the at least one search phrase, an indication may be received from a user specifying to perform one of a noisy phrase search or a noiseless phrase search. The method may search the index for the at least one search phrase based on the indication received from the user.

9 Claims, 5 Drawing Sheets

U.S. PATENT DOCUMENTS

| | | | | |
|---|---|---|---|---|
| 2006/0271526 | A1* | 11/2006 | Charnock et al. | 707/3 |
| 2007/0130123 | A1* | 6/2007 | Majumder | 707/3 |
| 2008/0077570 | A1* | 3/2008 | Tang et al. | 707/5 |
| 2008/0141117 | A1* | 6/2008 | King et al. | 715/238 |
| 2008/0222133 | A1* | 9/2008 | Au et al. | 707/5 |
| 2009/0276467 | A1* | 11/2009 | Scholtes et al. | 707/200 |

OTHER PUBLICATIONS

F. Ruth Gee, "The Cornell TIPSTER Phase III Project" In: "ACL Anthology: TIPSTER Text Program Phase III; Proceedings of a Workshop held at Baltimore, Maryland, Oct. 13-15, 1998" 1999, pp. 37-38.

N. Ziviani et al., "Modern Information Retrieval, Text Operations", Jan. 1, 1999, Modern Information Retrieval, Harlow: Addison-Wesley, GB, pp. 163-190.

M. Mitra et al., "Information Retrieval from Documents: A Survey" Information Retrieval, vol. 2000, vol. 2, part 2/3, 2000, pp. 141-163.

J. Picard, "Logic as a Tool in a Term Matching Information Retrieval System", In: "Proceedings of the Workshop on Logical and Uncertainty Models for Information Systems" 1999, University College London (UCL), London, England, pp. 1-15.

PCT International Search Report and Written Opinion issued by the European Patent Office on Sep. 11, 2009 for PCT International Patent Application PCT/US2009/47533, 15 pages.

* cited by examiner

SYSTEMS AND METHODS FOR DOCUMENT SEARCHING

BACKGROUND

I. Technical Field

The present invention generally relates to the field of computerized systems and document searching. More particularly, the invention relates to computer-based systems and methods that provide flexible text based searching capabilities.

II. Background Information

Due to the increasing volume of information that is stored in computer systems, it is more difficult then ever before to locate information that is relevant among other information that is not relevant. A search for information that is stored in a computer system may be conducted using an information retrieval system that is typically referred to as a search engine. One example of a search engine is a Web search engine, which can search for information on the World Wide Web.

To quickly locate desired information, search engines make use of a search index. A search index provides a shorthand for locating documents when processing a search query. A search index also optimizes speed and performance in finding relevant documents for a search query. The term indexing refers to the process of collecting, parsing, and storing data for a search index. Without an index, the search engine would scan every document during a search, requiring considerable time and computing power. The additional computer storage required to store the index, as well as the considerable increase in the time required for an update to take place, are the costs paid for the time saved during a search.

The process of creating a search index generally includes tokenization. Tokenization refers to the process of identifying sequences of characters that represent words and other elements, such as punctuation, which are represented by numeric codes. Document tokenization first breaks a stream of characters into keywords based on specifically defined segmentation points such as XML mark-up, spaces, or certain punctuation characters including commas, colons, semicolons, question marks, and periods. The resulting segments from the tokenization process are considered to be keywords. The tokenization process also determines the position of a keyword within a document. The output from the tokenization process is a series of keywords listed with keyword identification information, such as document identifiers and sequentially numbered keyword positions.

After all documents are tokenized, the tokens are sorted by keyword value. The sorting results in a list of keywords, along with the keyword position information for each occurrence of the keyword. The sorted keywords are combined to form a single list of keywords and accompanying identification information for the document collection. This process of combining the tokens from all of the documents in a collection is referred to as merging.

Once a merged index is created, a search query must also be tokenized in a manner similar to tokenizing the document. When a search query is entered into a search system, the search system searches the merged index to complete the search request. A competed search request outputs a list of all the documents and the respective locations that meet the search request criteria.

Historically, search systems, such as search engines, have categorized certain words that appear in a document as noise words or stop words. Noise words typically occur in most documents. Examples of noise words include "the", "an", "of", "to", etc. Due to the frequency at which these words occur in documents, noise words may offer limited value in search processing while introducing high processing costs. As a result, conventional text retrieval systems do not index these words. Omitting these noise words in the keyword index reduces the storage and processing requirements for the searching and indexing of a document collection. However, when noise words are not included in a keyword index, a search system is unable to search for certain phrases that include noise words when desired. Accordingly, ignoring noise words may not produce desired results.

Words that are generally considered noise words might be important to the effectiveness of one phrase search, while having little value in another phrase search. For example, "me" and "too" are typically defined as noise words. In a conventional search system, the phrase "me too hungry" would not be searchable. Instead, the query would find all occurrences of the word "hungry." Conversely, a search index that indexes all noise words might also lead to unintended search results. For example, the phrase "right to privacy" may be used interchangeably with the phrase "right of privacy." In this example, indexing the noise word "of" would prevent the search from returning documents that contain "right of privacy." As is evident from the foregoing, there is a need for improved systems and methods for searching that takes into consideration noise words in order to provide more effective search results.

SUMMARY

Consistent with a disclosed embodiment, a computer-implemented method provides keyword searching. The method may receive a plurality of noisy keywords for a document collection. A server may generate tokens for a plurality of keywords in the document collection and merge the tokens to create an index. The method may further receive receiving a search query, wherein the search query includes at least one search phrase. The method may further receive, for the at least one search phrase, an indication from a user specifying to perform one of a noisy phrase search or a noiseless phrase search. The method may then search the index for the at least one search phrase based on the indication received from the user.

Consistent with another disclosed embodiment, a system is provided for creating an index for a document collection. The system may comprise a database storing a plurality of noisy keywords for a document collection and a computer-readable storage medium storing instructions. The instructions may compare a keyword in one or more documents to the plurality of noisy keywords, determine whether the keyword is a noisy keyword, determine, for one of the documents, a keyword position and a number of noisy keywords preceding the keyword, and create, for the one of the documents, a token. The token may include a document identifier, an indication whether the keyword is a noisy keyword, the keyword position, and the number of noisy keywords preceding the keyword. The token may be stored in an index.

Consistent with another disclosed embodiment, a computer-implemented method is provided for tokenizing keywords in a keyword search. The method may receive, from a database, a plurality of noisy keywords for a document collection, determine whether a keyword in a search query is a noisy keyword by comparing the keyword to the plurality of noisy keywords, tag the keyword with a noisy keyword tag when the keyword is found in the noisy keyword list, determines keyword position and a number of noisy keywords preceding the keyword, and output a token. The token may include a document identifier, the noisy keyword tag, the keyword position, and the number of noisy keywords preceding the keyword.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate various embodiments and aspects of the present invention. In the drawings.

DETAILED DESCRIPTION

The following detailed description refers to the accompanying drawings. Wherever possible, the same reference numbers are used in the drawings and the following description to refer to the same or similar parts. While several exemplary embodiments are described herein, modifications, adaptations and other implementations are possible, without departing from the spirit and scope of the invention. For example, substitutions, additions or modifications may be made to the components illustrated in the drawings, and the exemplary methods described herein may be modified by substituting, reordering, or adding steps to the disclosed methods. Accordingly, the following detailed description does not limit the invention. Instead, the proper scope of the invention is defined by the appended claims.

Figure 1:
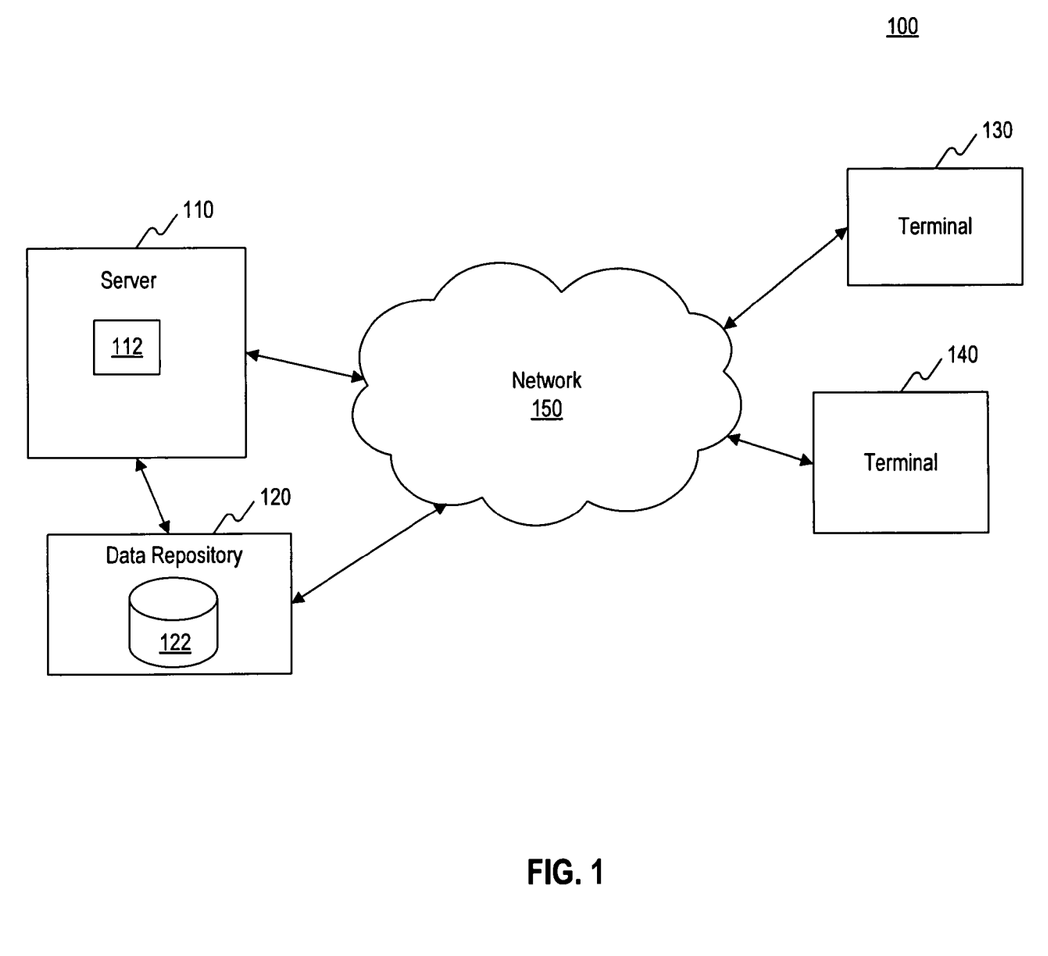
FIG. 1 is an example of a system for searching a document collection, consistent with a disclosed embodiment.

FIG. 1 is an example of a search system 100 that may search a document index. As shown in system 100, server 110, data repository 120, and terminals 130 and 140 are connected to a network 150. Although a specific numbers of servers and two terminals are depicted in FIG. 1, any number of these devices may be provided. Furthermore, the functions provided by one or more devices of system 100 may be combined. In particular, the functionality of any one or more devices of system 100 may be implemented by any appropriate computing environment.

Network 150 provides communications between the various devices in system 100, such as server 110, data repository server 120, and terminals 130 and 140. In addition, search server 110 may access legacy systems (not shown) via network 150, or may directly access legacy systems, databases, or other network applications. Network 150 may be a shared, public, or private network, may encompass a wide area or local area, and may be implemented through any suitable combination of wired and/or wireless communication networks. Furthermore, network 150 may comprise a local area network (LAN), a wide area network (WAN), an intranet, or the Internet.

Search server 110 may comprise a computer (e.g., a personal computer, network computer, server, or mainframe computer) having one or more processors (not shown) that may be selectively activated or reconfigured by a computer program. Furthermore, search server 110 may distribute data for parallel processing by one or more additional servers (not shown). Search server 110 may also be implemented in a distributed network. Alternatively, search server 110 may be specially constructed for carrying-out methods consistent with disclosed embodiments.

Server 110 may include a memory 112 for storing program modules that, when executed by a processor, perform one or more processes that create document indices or search document indices. Memory 112 may be one or more memory devices that store data as well as software and may also comprise, for example, one or more of RAM, ROM, magnetic storage, or optical storage.

Data repository 120 may include a database 122 that stores a document collection and the document indices associated with the document collection. Although one database is shown in FIG. 1, data repository 120 may include more than one database. Furthermore, data repository 120 may receive data from search server 110, terminals 130-140, and/or other servers (not shown) available via network 150. Although shown as separate entities in FIG. 1, server 110 and data repository server 120 may be combined. For example, search server 110 may include one or more databases in addition to or instead of data repository 120. Furthermore, search server 110 and data repository 120 may exchange data directly or via network 150.

Terminals 130-140 may be any type of device for communicating with server 110 and/or data repository 120 over network 150. For example, terminals 130-140 may be personal computers, handheld devices, or any other appropriate computing platform or device capable of exchanging data with network 150. Terminals 130-140 may each include a processor (not shown) and a memory (not shown). Furthermore, terminals 130-140 may execute program modules that provide one or more graphical user interfaces (GUIs) for interacting with network resources and/or accessing search server 110. For example, one of terminals 130-140 may transmit a search query or data set (e.g., a webpage, a newspaper article, a book, etc.) to search server 110.

Figure 2:
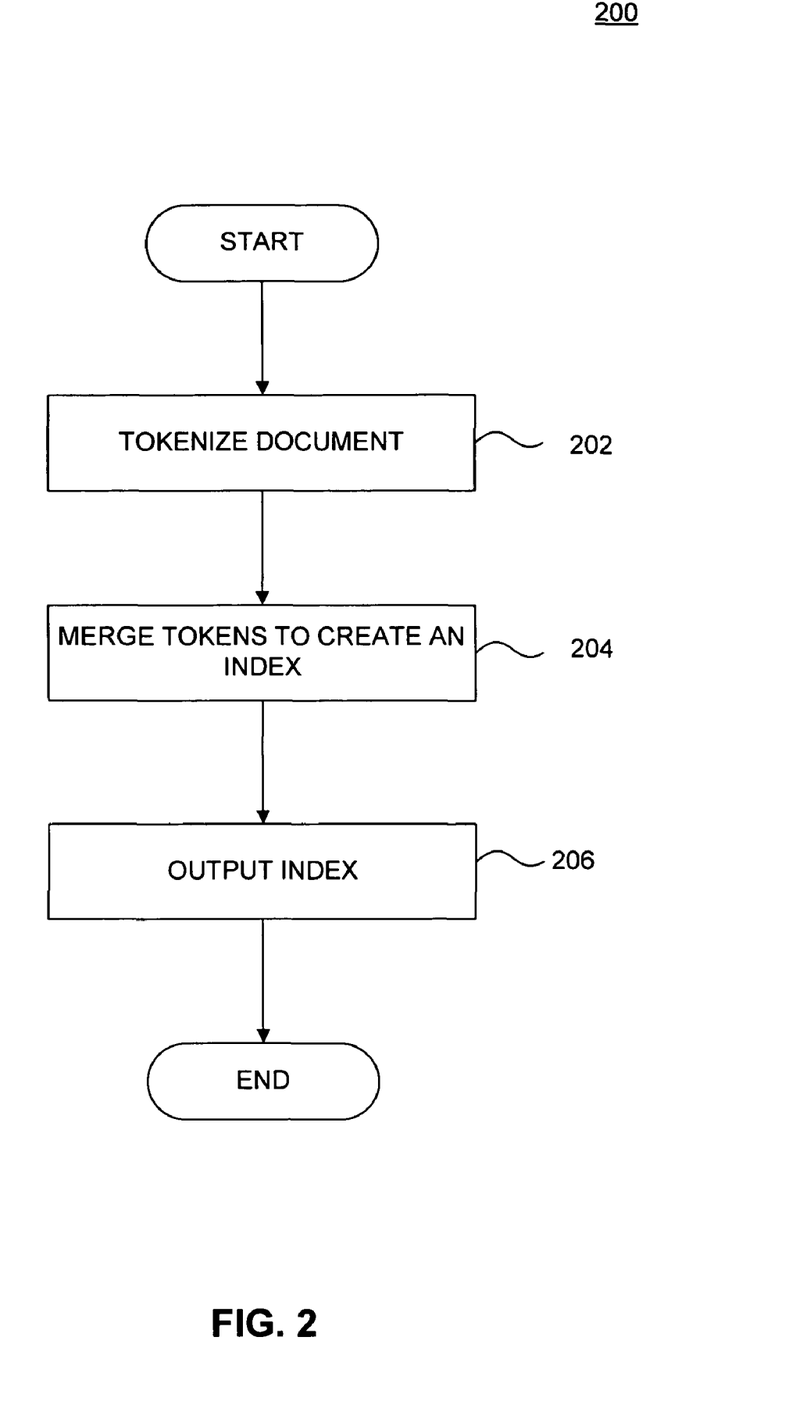
FIG. 2 is a flow diagram of an exemplary method for creating a document index, consistent with a disclosed embodiment.

FIG. 2 is a flow diagram 200 of an exemplary method for creating a document index, consistent with a disclosed embodiment. The method described in connection with FIG. 2 may be implemented by, for example, program modules stored in memory 112 of server 110.

At the start of the method, in step 202, server 110 may tokenize keywords of the documents that are included in a document collection. For example, the document collection may be stored in data repository 122 or may be available from another source over network 150. This step may include segmenting the text of one or more of the documents into a stream of tokens. This step is described in more detail in connection with FIG. 3.

Next, in step 204, server 110 may merge the tokenized keywords. The merging process may include sorting the tokenized keywords to form a single list or table of keywords and accompanying identification information for the document collection. Accordingly, the result of step 204 may be an index for the collection that can be searched by keyword. Each tokenized keyword may include an entry listing the document identifier, the keyword position within the document, and the number of noisy keywords preceding the keyword.

In step 206, server 110 may output a merged document index. The merged document index may be used by the search process shown in FIG. 3.

Figure 3:
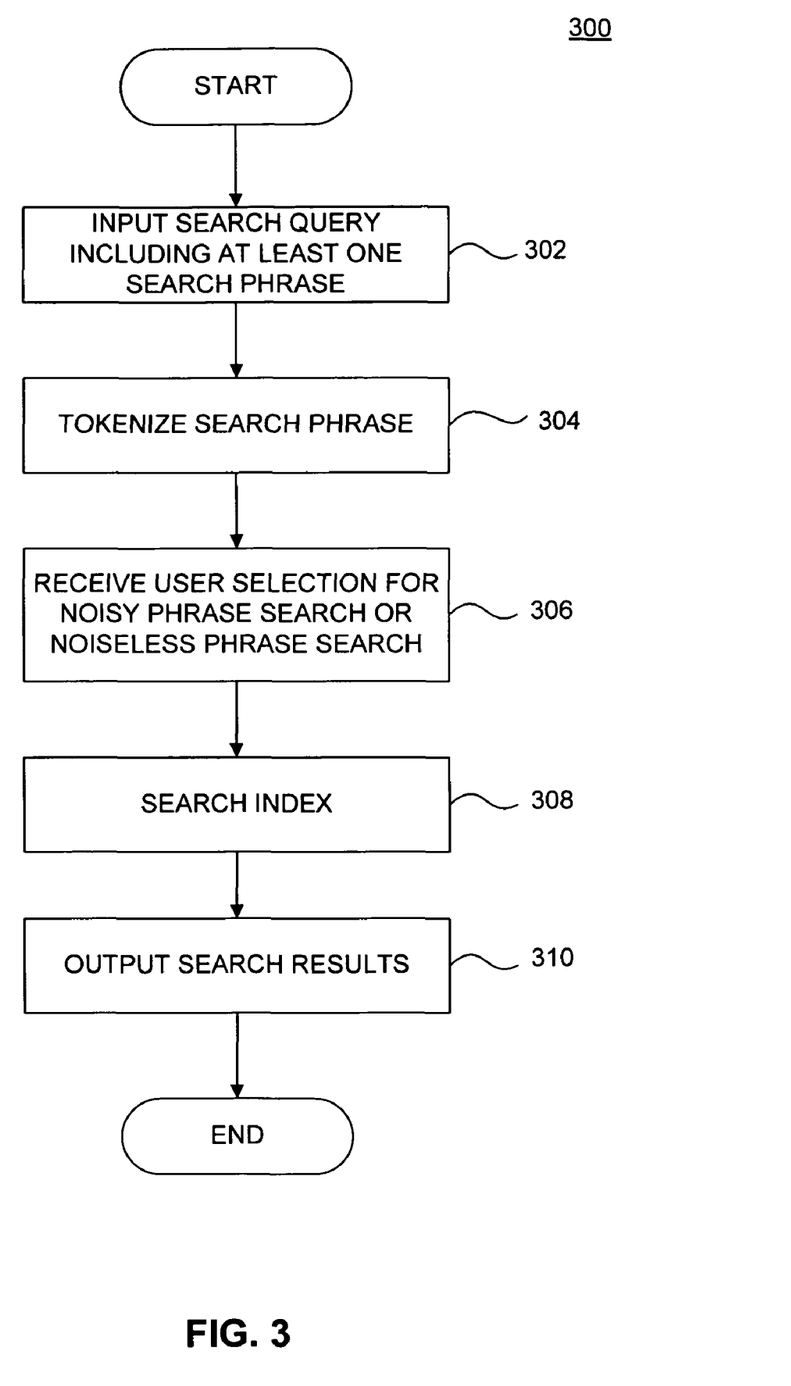
FIG. 3 is a flow diagram of an exemplary method for performing search query, consistent with a disclosed embodiment.

FIG. 3 is a flow diagram 300 of an exemplary method for performing search query, consistent with a disclosed embodiment. The method described in connection with FIG. 3 may be implemented by, for example, program modules stored in memory 112 of server 110. In the method, server 110 may receive from a user an indication of whether to perform a noisy phrase search or a noiseless phrase search. Alternatively, in another implementation of the method, server 110 may automatically determine whether to perform a noisy phrase search or a noiseless phrase search. For example, a system administrator may pre-configure server 110 to perform a noisy phrase search or a noiseless phrase search.

At the start of the method, in step 302, a search query that includes at least one search phrase is received by a search system, such as server 110. For example, a user at one of terminals 130-140 or may submit the search query. Alternatively, search server 110 may receive the search query over network 150 from another source (e.g., another server). In yet another alternative, a system administrator may pre-configure server 110 to perform a noisy phrase search or a noiseless phrase search In step 304, server 110 may tokenize keywords of the search query. This step may include segmenting the text of the search query into a stream of tokens. This step is described in more detail in connection with FIG. 4.

In step 306, server 110 may receive from a user an indication of whether to perform a noisy phrase search or a noiseless phrase search. The indication may be specified by quotations around the search phrase. For example, quotations around the search phrase may specify a selection of a noisy phrase search. No quotations around the phrase search may indicate that a noiseless phrase search has been selected.

In step 308, server 110 searches the merged document index to complete the search request. For example, a query may search for documents meeting the search query parameters by locating the keywords within the document index, and using the keyword position information to resolve the search phrase. This step is described in more detail in connection with FIG. 5.

In step 310, server 110 may output one or more search results. The search output may be a list of documents that meet the search request criteria. Furthermore, the search output may also specify locations in the document that meet the search request criteria.

Figure 4:
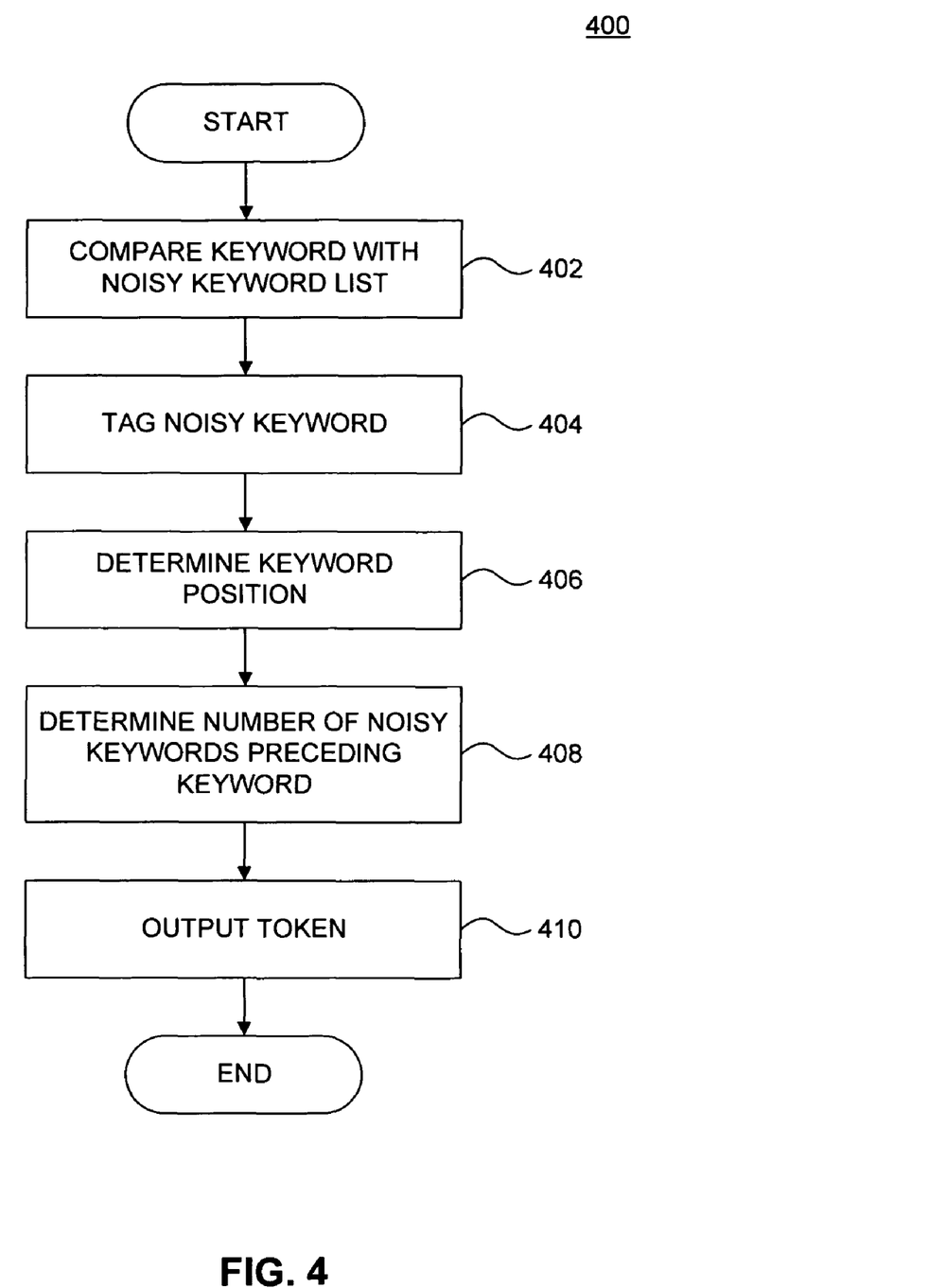
FIG. 4 is a flow diagram of an exemplary method for performing the keyword tokenizing process 202 of FIG. 2, consistent with a disclosed embodiment.

FIG. 4 is a flow diagram of an exemplary method for performing the keyword tokenizing process 202 of FIG. 2, consistent with a disclosed embodiment. FIG. 4 provides further details concerning tokenizing a keyword and evaluating whether or not the keyword is a noisy keyword.

In step 402, server 110 may check a keyword against a plurality of noisy keywords. The noisy keywords may be stored as a file or table in, for example, data repository 120, or may be accessed by server 110 over network 150. The noisy keywords may include keywords from a standard noise word list. A user may also input specific noisy keywords for a particular document or document collection.

In step 404, server 110 may tag the keyword if it is a noisy keyword. The tag may act as a marker to indicate the keyword is a noisy keyword. Tagging the noisy keyword may be performed by setting a flag in the token, indicating the tokenized keyword is a noisy keyword.

In step 406, server 110 may determine a keyword position of the keyword. The keyword position is the numerical position of a keyword in a particular document.

In step 408, server 110 may determine a number of noisy keywords that precede the keyword. This number refers to the number of consecutive noisy keywords that directly precede the keyword.

In step 410, server 110 may output a token. The token may include the keyword, the document identifier, the keyword position, and the number of noisy keywords that precede the keyword.

Figure 5:
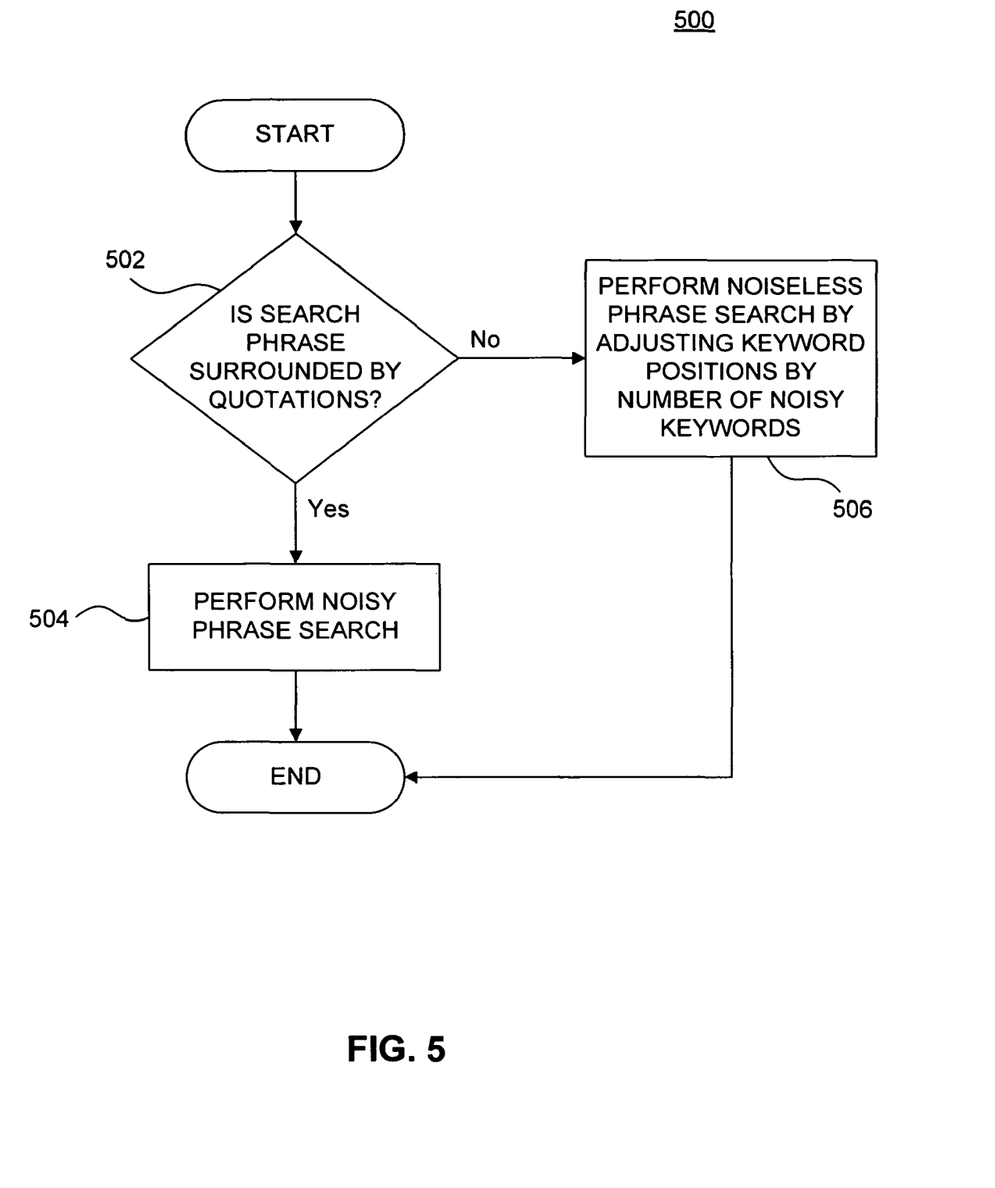
FIG. 5 is a flow diagram of an exemplary method for performing the index search process 308 of FIG. 3, consistent with a disclosed embodiment.

FIG. 5 is a flow diagram of an exemplary method for performing the index search process 308 of FIG. 2, consistent with a disclosed embodiment.

In step 502, server 110 may determine whether a search is a noisy phrase search or a noiseless phrase search. For example, a phrase surrounded by quotations may be searched as a noisy phrase, while a phrase which is not surrounded by quotations may be searched as a noiseless phrase. Alternatively, server 110 may default to a predetermined search setting specifying whether to process a search query according to a noisy phrase search or a noiseless phrase search. If the search is a noisy phrase search (e.g., the search query is surrounded by quotations), the method proceeds to step 504. If the search is noiseless phrase search (e.g., the search query is not surrounded by quotations), then the method proceeds to step 406.

In step 504, server 110 may perform a noisy phrase search. For example, server 110 may search the search query, including the noise words, in the merged document index. The process then ends.

In step 506, when the search is a noiseless phrase search, server 110 may adjust the keyword positions for each keyword comparison in a noiseless phrase search. For example, server 110 may adjust the keyword positions by subtracting the number of noisy keywords that precede the keyword from the keyword position value. Server 110 may perform a noiseless phrase search while adjusting the keyword positions. In processing the noiseless phrase search, server 110 may ignore the noise words in the search query.

The foregoing description has been presented for purposes of illustration. It is not exhaustive and does not limit the invention to the precise forms or embodiments disclosed. Modifications and adaptations will be apparent to those skilled in the art from consideration of the specification and practice of the disclosed embodiments of the invention. For example, the described implementations include software, but systems and methods consistent with the present invention may be implemented as a combination of hardware and software or in hardware alone. Examples of hardware include computing or processing systems, including personal computers, servers, laptops, mainframes, micro-processors and the like. Additionally, although aspects of the invention are described for being stored in memory, these aspects can also be stored on other types of computer readable media, such as secondary storage devices, for example, hard disks, floppy disks, CD ROM, or other forms of RAM or ROM.

Computer programs based on the written description and methods of this invention are within the skill of an experienced developer. The various programs or program modules can be created using any of the known techniques or can be designed in connection with existing software. For example, program sections or program modules can be designed in or by means of Java, C++, HTML, XML, or HTML with included Java applets. One or more of such software sections or modules can be integrated into a computer system or existing e-mail or browser software.

Moreover, while illustrative embodiments of the invention have been described herein, the scope of the invention includes any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. Further, the steps of the disclosed routines may be modified in any manner, including by reordering steps and/or inserting or deleting steps, without departing from the principles of the invention. It is intended, therefore, that the specification and examples be considered as exemplary only, with a true scope and spirit of the invention being indicated by the following claims and their full scope of equivalents.

What is claimed is:

1. A computer-implemented method for keyword searching, the method comprising:
    generating, by a server, tokens for a plurality of keywords in a document collection, wherein the generating further comprises determining a keyword position of a keyword in a document of the document collection, and determining a number of noisy keywords preceding the keyword in the document;
    merging the tokens to create an index;
    receiving a search query, wherein the search query includes at least one search phrase;
    receiving, for the at least one search phrase, an indication from a user specifying to perform one of a noisy phrase search or a noiseless phrase search;
    searching the index for the at least one search phrase based on the indication received from the user; and
    when the indication from the user specifies a noiseless phrase search, performing the noiseless phrase search at least in part by subtracting a value of the keyword position by the number of noisy keywords preceding the keyword.

2. The computer-implemented method of claim 1, wherein creating a token for one of the keywords further comprises:
    determining whether the keyword is a noisy keyword by comparing the keyword to the plurality of noisy keywords;
    tagging the keyword with a noisy keyword tag when the keyword is determined to be a noisy keyword; and
    outputting the token, wherein the token comprises a document identifier, the noisy keyword tag, the keyword position, and the number of noisy keywords preceding the keyword.

3. The computer-implemented method of claim 1, wherein the noisy phrase search includes the noisy keywords in the search query and the noiseless phrase search ignores the noisy keywords in the search query.

4. The computer-implemented method of claim 1, wherein the plurality of noisy keywords are specific to a particular document.

5. The computer-implemented method of claim 1, wherein searching the index further comprises:
    determining whether the at least one search phrase is surrounded by quotations; and
    when the at least one search phrase is surrounded by quotations, performing a noisy phrase search, and when the at least one search phrase is not surrounded by quotations, performing a noiseless phrase search.

6. The computer-implemented method of claim 1, wherein searching the index further comprises tokenizing the search query prior to performing the search.

7. The computer-implemented method of claim 1, wherein the search query includes both noisy search phrases and noiseless search phrases.

8. The computer-implemented method of claim 1, wherein the noisy keywords offer limited value in search processing while introducing additional processing costs.

9. The computer-implemented method of claim 1, wherein the number of noisy keywords is the number of consecutive noisy keywords directly preceding the at least one of the keywords in the document of the document collection.

* * * * *